United States Patent Office 3,228,915
Patented Jan. 11, 1966

3,228,915
COPOLYMER OF DIETHYLENEGLYCOL-BIS-AL-LYLCARBONATE, TRIALLYLCYANURATE AND A STYRENE
Hubert Sauer, Letmathe, Sauerland, and Hans Binder, Frankfurt am Main, Germany, assignors to Rutgerswerke-Aktiengesellschaft, Frankfurt am Main, Germany
No Drawing. Filed Apr. 29, 1963, Ser. No. 276,185
Claims priority, application Germany, May 3, 1962, R 32,608
1 Claim. (Cl. 260—77.5)

This invention relates to a process for preparing colorless, transparent, cross-linked high polymers having predetermined refractive constants for optical purposes, particularly for menisci of eyeglasses. It has been known to use synthetic plastics for the production of optical molded articles. A series of thermoplastic materials have been suggested for this purpose, some of which, due to their composition, have refractive numbers which are in the internationally usual range of refractive number for menisci of eyeglasses, i.e. 1.5230±0.0003 (see Kunststoffe 36, (1946), page 37, and Kunststoffe 44, (1954), page 9). However, these thermoplastic materials have—due to their very low transformation points—considerable disadvantages in comparison with silicate glasses, because particularly their resistance to scratching is very low and the danger of "cold flowing" is very considerable so that changes of the optical characteristics easily occur.

Such disadvantages, which are present in optical molded bodies made of thermoplastic synthetic materials, do not occur in those organic high polymers, which consist of cross-linked synthetic materials, because these materials have no transformation points at the temperature of their use. For producing such optical molded bodies from cross-linked synthetic plastics mainly diethyleneglycol-bis-allylcarbonate is used. Production of the molded parts takes place preferably by polymerization with suitable catalysts in corresponding molds. While the mechanical stress values of these molded parts are essentially more favorable than the corresponding values of molded parts made of thermoplastic material, the cured diethyleneglycol-bis-allylcarbonate has a refractive number of $n_D=1.4995$ only. In producing disks for eye-glasses of more than ±4 diopter, the edge thickness or center thickness of the lenses becomes increased to such an extent that they appear unwieldy or clumsy and the advantage of the low specific gravity in comparison with the conventional silicate glass is lost. Furthermore, the calculation for the eyeglass lenses is based on a refraction number of $n_D=1.5230$, and calculations for a material having essentially lower refraction values, as stated above, would require an extremely great additional expenditure of work. In order to eliminate these disadvantages, the refraction value of organic glasses should be in the range of about $n_D=1.5200$ to 1.5260.

It has now been found that these requirements with regard to the refraction number can be met if to the diethyleneglycol-bis-allylcarbonate (compound I) prior to the polymerization such substances are added which undergo mixed polymerization with (I) and which themselves have a higher refraction value than (I).

Mixtures of diethyleneglycol-bis-allylcarbonate with triallylcyanurate and with vinylaromatic compounds have been found suitable for this purpose. Vinylaromatic compounds are suitable mainly due to their relatively high light-refracting power. However, if they are used in a proportion which results in a sufficient increase of the refractive number of the diethyleneglycol-bis-allylcarbonate, the vinylaromatics cannot be satisfactorily polymerized with the latter alone, because in polymerized condition they are not completely compatible with compound (I) and the resulting products are of not sufficient optical purity.

The ternary addition of triallylcyanurate eliminates this phenomenon and renders the increase of the refractive numbers to the desired level feasible. In this connection, it is of particular advantage that monomeric triallylcyanurate has likewise a higher refractive value ($n_D^{25}=1.5049$) than monomeric diethyleneglycol - bis - allylcarbonate ($n_D^{20}=1.4503$).

By variation of the proportions in the mixtures according to the invention products can be obtained which have any refraction numbers in the desired ranges.

Mixed polymerizates of diethyleneglycol-bis-allylcarbonate with diallylphthalate have already been described (see Industrial and Engineering Chemistry, 47 (1955), pp. 302–304). However, the mechanical strength of these substances is not satisfactory. An addition of alkenedicarboxylicacid esters, e.g. dibutylmaleinate, as disclosed in the U.S. Patent No. 2,964,501, results in products having improved mechanical characteristics, but such addition has the effect of reducing the light refraction power. The mixture disclosed in this patent, which shows the best optical results, has an $n_D$ value which is below the desired minimum value of 1.5200.

Copolymerizates of diethyleneglycol-bis-allylcarbonate with triallylcyanurate have been known from the art (see Industrial and Engineering Chemistry 47 (1955), pp. 302–304). However, the incorporation of substantial amounts of triallylcyanurate caused the occurrence of a considerable rigidness of the diethyleneglycol-bis-allylcarbonate. Such copolymerized products which contain more than 10% triallylcyanurate are rigid to such an extent that they cannot be used e.g. for the production of eyeglasses. At said concentration of 10%, the refractive value is below the desired limit.

It has also been suggested to add to copolymerizates of diethyleneglycol-bis-allylcarbonate with triallylcyanurate further compounds capable of mixed polymerization, mainly esters of methacrylic acid, e.g. methylmethacrylate (see British Patent No. 796,867). The addition of methylmethacrylate which has a relatively very low own refractive value, causes a reduction of the light refractive capacity and the resulting products are beyond the range contemplated according to the present invention.

It has been known from the British Patent No. 818,471 to subject ternary mixtures of diethyleneglycol-bis-allylcarbonate to pre-polymerization, e.g. with triallylcyanurate and methylmethacrylate and to subject the resulting pre-polymerizates in a second step to complete cross-linking. The ternary mixtures described in the examples of said British patent, i.e. ternary mixtures of methylmethacrylate and mixtures of various methylmethacrylates, have after polymerization a refractive value, which is far below the above stated lower limit of 1.5200. The British Patent 818,471 further states that instead of methylmethacrylate other vinyl compounds, such as styrene, can be used. If, however, in Example 1 of the British patent the methylmethacrylate is substituted by styrene, after polymerization molded parts are obtained which are turbid. Thus, complete miscibility of the components in cured condition is not obtained and a use of the polymerizates for the construction of optical implements is not possible. Moreover, the hardness of these molded articles is so low that a hardness determination e.g. according to Rockwell M is not feasible. In view of these characteristics it is obvious that it was not the object of this British patent to prepare for optical purposes solid bodies consisting of high polymers. Therefore, it could not be inferred from the British patent that mixtures of specific composition according to the present invention are excellently suitable for the preparation of optical molded bodies.

Furthermore, mixed polymerizates of diethyleneglycol-bis-allylcarbonate with maleinimide and its various N-substitution products have been described for the purpose of accelerating polymerization of diethyleneglycol-bis-allylcarbonate (see U.S. Patent No. 2,650,215). However, thereby no increase but a decrease of the refractive value is attained, because the added substances have lower refractive values than diethyleneglycol-bis-allylcarbonate.

The use of diethyleneglycol-bis-allylcarbonate, together with triallylcyanurate and vinylbenzols for the production of optically useful organic glasses, yields after polymerization molded bodies or articles which have for the production of eyeglasses the desired refractive number, as well as maximum strength values with regard to hardness, tenacity and resistance to abrasion.

The amounts of triallylcyanurate and vinylbenzol which are added to the diethyleneglycol-bis-allylcarbonate, in order to obtain the desired refractive value, vary between about the following limits (calculated on 100 parts by weight of the total mixture):

| | Parts |
|---|---|
| Vinylbenzol | 2.5–5.0 |
| Triallylcyanurate | 30–40 |

Polymerization of the starting mixtures can be carried out in conventional manner with conventional peroxides, particularly suitable is isopropylpercarbonate.

The copolymerizate can be prepared, if desired, in colored form.

The following examples describe some specific embodiments of and best modes for carrying out the invention, to which the invention is not limited.

*Example 1*

65 parts of diethyleneglycol-bis-allylcarbonate, 32.5 parts of triallylcyanurate, and 2.5 parts of styrene, are mixed with 3.5 parts isopropylpercarbonate, filtered and subjected to polymerization during 20 hours at a temperature rising from 40° C. to 120° C. as the end temperature. At this temperature of 120° C. the polymerization product is tempered for further 2 hours.

The refraction value of the starting mixture amounts to $n_D^{20}=1.4765$.

*Example 2*

In the manner described in the above Example 1, 65 parts of diethyleneglycol-bis-allylcarbonate, 32.5 parts of triallylcyanurate and 2.5 parts of α-methylstyrene, are polymerized with 4.5 parts of isopropylpercarbonate. The index of refraction of the starting mixture amounts to $n_D^{20}=1.4763$.

*Example 3*

In the manner described in the above Example 1, 65 parts of diethyleneglycol-bis-allylcarbonate, 32.5 parts of triallylcyanurate and 2.5 parts vinyltoluene are polymerized with 3 parts of isopropylpercarbonate. The refractive value of the starting mixture amounts to $n_D^{20}=1.4767$.

Examination of the products obtained in the above Examples 1–3, in comparison with diethyleneglycol-bis-allylcarbonate gave the following results:

| Polymerizate of Example | $n_D^{20}$ | Hardness Rockwell M |
|---|---|---|
| 1 | 1.5237 | 107 |
| 2 | 1.5215 | 86 |
| 3 | 1.5207 | 90 |
| Diethyleneglycol-bis-allylcarbonate | 1.4995 | 81 |

The parts and percentages given herein are by weight if not otherwise stated.

As further examples of peroxides dibenzoylperoxide, tert.-butylperbenzoate, dicumylperoxide, p-chlorobenzoylperoxide, and di-tert.-butylperoxide are mentioned.

Instead of the term "transformation point" sometimes the term "transition temperature" is preferred in order to denote temperatures at which the characteristics of a product change.

What is claimed is:

A transparent organic synthetic material consisting of a mixture copolymerized in the temperature range of 40–120° C. in the presence of an organic peroxide catalyst selected from the group consisting of isopropylpercarbonate, dibenzoylperoxide, tert.-butylperbenzoate, dicumylperoxide, p-chlorobenzoylperoxide, and di-tert.-butylperoxide, said mixture consisting of diethyleneglycol-bis-allylcarbonate with 30–40 parts by weight of triallylcyanurate and 2.5–5.0 parts by weight of a vinyl compound selected from the group consisting of styrene, α-methylstyrene and vinyltoluene, calculated for 100 parts by weight of the total mixture, the copolymerized mixture having a refractive number in the range of $n_D=1.5200$ to 1.5260 and a Rockwell M hardness in the range of 107–86.

References Cited by the Examiner

UNITED STATES PATENTS 3,030,745   4/1962   Freeman _____ 88—57
3,038,210   6/1962   Hungerford et al. _____ 88—57

FOREIGN PATENTS 818,471   8/1959   Great Britain.

SAMUEL H. BLECH, *Primary Examiner.*

DONALD E. CZAJA, MURRAY TILLMAN, *Examiners.*